Figure 1:
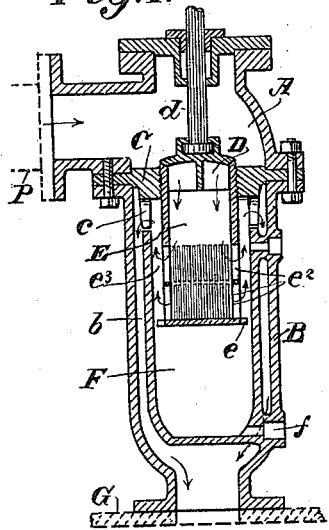

(No Model.)

J. C. H. STUT.
SEPARATING THROTTLE VALVE.

No. 579,457. Patented Mar. 23, 1897.

Witnesses,

Inventor,
John C. H. Stut,
By Dewey & Co.
Atty.

UNITED STATES PATENT OFFICE.

JOHN C. H. STUT, OF OAKLAND, CALIFORNIA.

SEPARATING THROTTLE-VALVE.

SPECIFICATION forming part of Letters Patent No. 579,457, dated March 23, 1897.

Application filed September 23, 1896. Serial No. 606,703. (No model.)

*To all whom it may concern:*

Be it known that I, JOHN CHRISTIAN HENRY STUT, a citizen of the United States, residing at Oakland, county of Alameda, State of California, have invented a Separating Throttle-Valve; and I hereby declare the following to be a full, clear, and exact description of the same.

My invention relates to devices by which the steam in the steam-pipe is controlled on its way to its place of use, and it especially relates to a throttle-valve which by reason of its combination with a means for separating the water from the steam may be correctly termed a "separating" throttle-valve.

My invention consists in the novel separating mechanism and in combination therewith the throttle-valve, as I shall hereinafter fully describe.

The object of my invention is to provide a throttle-valve by which the flow of the steam can be regulated in a steam-pipe as with any ordinary throttle-valve, said valve to have in substantially intimate connection therewith a water and steam separating device whereby all the water coming with the steam from the boilers or that which results from condensation in the steam-pipe before it reaches the valve will be separated from the steam, so that all the steam as it enters its place of use will be perfectly dry and the water that was contained in it will be separated out into a receptacle and thence will be drawn off to any convenient place.

This separating throttle-valve may be used in a steam-pipe the steam from which is to be used for any purpose, and for the mere sake of illustration I will assume that it is to be delivered into the steam-chest of an engine, though I do not confine myself to this use, as the perfectly-dry steam is advantageous in many other uses, such, for example, as in the coils of an evaporating-pan; but in order to show its utility in any use to which my invention is applicable I have, as I have stated, selected for the purpose of illustration the steam-chest of an engine, in which case said steam-chest represents the point or place of use. As this separating throttle-valve can be placed in close proximity to this place of use, say the steam-chest of any cylinder, and can take the place of any ordinary throttle-valve, and as the great advantage of dry steam for an engine is well known, the advantages of my separating throttle-valve over an ordinary steam-separator will be at once apparent, for in the latter case the separator by reason of its bulky size is used at a place considerably distant from the throttle-valve and from the steam-chest, and hence the water resulting from condensation in the steam-pipe between the separator and the steam-chest will enter the steam-cylinder, whereas by my invention this cannot take place. Furthermore, by combining a throttle-valve with a steam-separator I save in weight, size, and space and effect an economy in the manufacture of the device.

There may be many different forms of my invention, depending upon the relative location of the throttle-valve and the separating device and the character of the throttle-valve, which may be of any known form. Several of these forms and arrangements I have herein illustrated, as will be seen by the accompanying drawings, in which—

Figure 2:
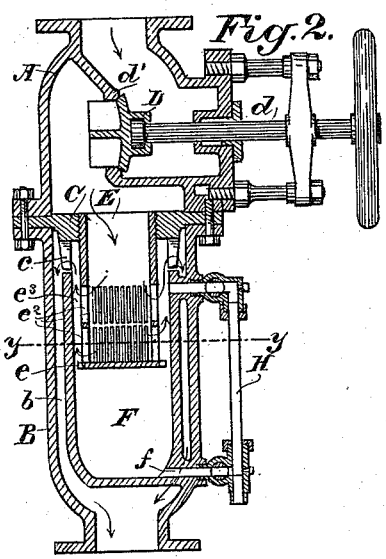
Figure 3:
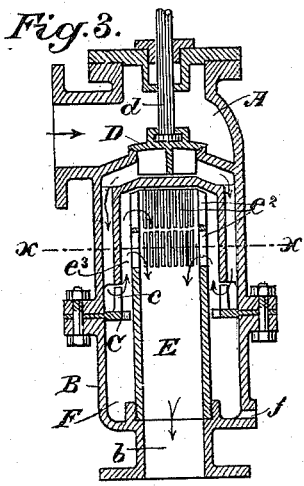
Figure 4:
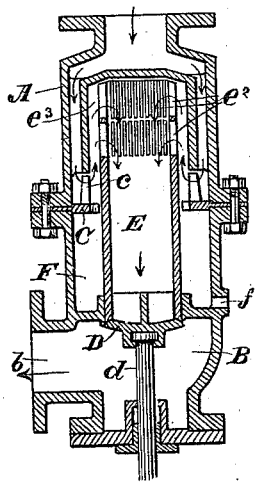
Figure 5:
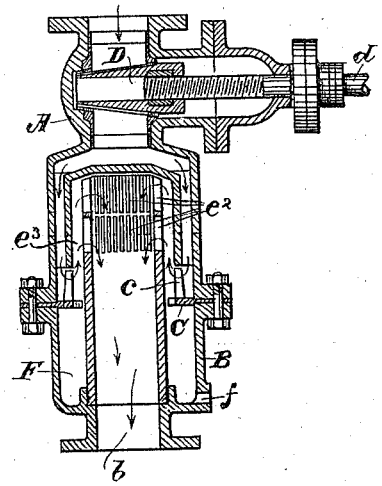
Figure 6:
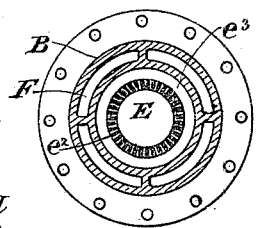
Figure 7:
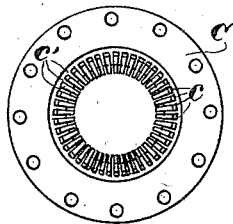
Figure 8:
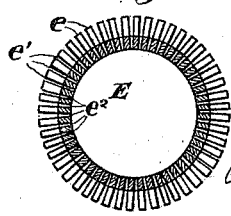

Figure 1 is a vertical section of my separator throttle-valve, showing the throttle-valve seated upon the top of the inlet to the separator and also showing the steam leaving the separating device and passing outside of the water-receptacle. Fig. 2 is a vertical section of a form similar to that of Fig. 1 in the arrangement of the separating device, but differing therefrom in the relative location of the throttle-valve. Fig. 3 is a vertical section showing an arrangement by which the steam leaves by passing to the inside of the water-receptacle. Fig. 4 is a vertical section showing an arrangement of a similar character, with the exception that the throttle-valve is at the lower portion of the separator. Fig. 5 is a vertical section showing an arrangement similar to that of Fig. 3, with a different style of valve. Fig. 6 is a horizontal section on the line $xx$ of Fig. 3. Fig. 7 is a plan of the slotted plate of Fig. 3. Fig. 8 is a horizontal section, enlarged, on the line $yy$ of Fig. 2.

Referring now to Fig. 1, it will be seen that the casing of the device is made in two parts A and B, bolted together, with the plate C intervening. The part A forms the steam-inlet connection with the steam-pipe P, a portion of which I have here shown in dotted lines. It also forms the box or bearing for the stem $d$ of the throttle-valve D. The plate C has an annular flange $c$, provided with a number of slots $c'$, and said plate is centrally apertured and has fitted thereto the inlet-pipe E of the separating mechanism. The upper end of this pipe forms the seat for the throttle-valve D. The lower end of this pipe is closed by a bottom which projects as a circumferential flange $e$, provided with slots $e'$. The lower portion of the pipe E has a series of slots $e^2$ made in its wall, said slots extending all around the pipe in circumferential series.

Within the part B of the casing and separated therefrom is formed the water-chamber F, having a closed bottom provided with a drain $f$, and the walls of said vessel extend up into close proximity with the downwardly-extending slotted flange $c$ of the plate C. The walls of this vessel are separated from the outer casing, thereby leaving a circumscribing space $b$ between the two, having a communication below with the place of use for the steam, said place of use being here indicated by dotted lines G, which may be regarded as representing the steam-chest. The entrance-pipe E extends down into the water-vessel, but is separated therefrom by an annular space $e^3$, as shown, which said space at one place is crossed wholly or partially by the slotted flange $e$.

The course of the steam is indicated by the arrows, from which it will be seen that it enters the part A, and when the throttle-valve D is opened it passes by said valve into the inlet-pipe E and thence is diverted and doubled upon itself outwardly through the slots $e^2$ of said inlet-pipe, by which the greater portion of the water is separated from it, and said steam thence arises in the space $e^3$ and doubles upon itself again outwardly through the slots of flange $c$ of plate C, where the remaining water is separated from it, and thence it passes down through the annular space $b$ in a perfectly-dry condition to its place of use. The separated water falls down into the bottom of the water vessel F and is drained off as necessary. The slotted flange $e$ serves to further divide or break up the steam and water and effect their separation.

In the other forms illustrated in the remaining figures I have placed upon corresponding parts similar letters, as it will be seen that, notwithstanding the different forms and arrangements, the same parts enter into the construction. It will therefore be only necessary to refer to each form briefly to show the differences in arrangement. Thus in Fig. 2 the throttle-valve D is fitted to a seat $d'$ in the upper portion A of the casing, and in this figure I have also represented a water-glass H, by which the amount of water in the vessel may be determined. All the other valves shown are to have this water-glass.

In Fig. 3 I have shown the water vessel as being exterior to the steam-outlet passage, and, as shown by the arrows, the steam first passes into the upper portion of this water-vessel, and thence through the slotted flange $c$ of plate C, and thence upwardly through the slots of the pipe E, and thence down through the outlet-pipe, and in this figure the throttle-valve D is shown as being fitted to a seat in the upper portion of said steam and water vessel.

In Fig. 4 the arrangement of parts is similar to Fig. 3, but the throttle-valve D is seated at the lower end of the steam-exit, and in Fig. 5 the arrangement for the entering steam and the separation of the water is similar to Figs. 3 and 4, but the throttle-valve is shown as an ordinary gate-valve in the upper portion of the casing. In all these forms it will be seen that the flow of steam has to double upon itself twice, and by this act of forcing the flow of steam to bend and letting it pass through a very large number of small apertures the water is separated out from the steam into the receptacle intended for it and drained off thence to any convenient place. The steam has to pass through two sets of these apertures or slots—namely, $e^2$ and $c'$—in order to make it thoroughly dry. It has to rise again after it passes the first set, so that all the water must leave the steam and enter its receptacle through the slotted annular series of openings $e'$, provided for it by flange $e$, whereby the steam is further broken up, and there is no tendency to agitate the water below.

A point to be noted is that those pieces which contain the apertures or slots $e^3$ and $c'$ are made independent of and adapted to be separated from the other portions of the device in order to replace them in case of wear. To this end it will be seen that the slotted pipe E is in every instance screwed into place, while the slotted plate C is bolted in them, these only representing any kind of removable fastenings.

Another point to be observed is that the total area of the small apertures for the steam to pass through is considerably more than that of the main steam-pipe, the object being to prevent any loss in steam-pressure and also to reduce the velocity of the steam in order to give the water still more time to separate from the steam. Thus it will be seen that the volume of steam is cut up into a very large number of small streams of steam, which facilitates the separation of the water to a greater extent. This cutting up of all the volume of steam into small streams also prevents any large volume of water from entering the cylinder suddenly in case the boiler should prime, thus preventing accident to the engine.

Having thus described my invention, what I claim as new, and desire to secure by Letters Patent, is—

1. A separating throttle-valve comprising a casing having a valve controlling the supply of steam to its place of use and having also a device for mechanically separating water from the steam, said device having a large number of small openings arranged in a plurality of separate sets occupying different vertical planes and separated by an intervening space or passage whereby the steam is caused, in passing through said openings and space or passage to bend upon itself a plurality of times in its flow to the exit.

2. A separating throttle-valve comprising a casing having a valve controlling the supply of steam to its place of use and having also a device for mechanically separating water from the steam, said device having a large number of small openings arranged in a plurality of separate sets occupying different vertical planes and separated by a space or passage whereby the steam is caused, in passing through said openings and space or passage to bend upon itself a plurality of times in its flow to the exit, said openings being made in parts adapted to be removed when worn, for the substitution of others.

3. A separating throttle-valve comprising a casing having a valve controlling the supply of steam to the place of use and having also a device for mechanically separating water from the steam, said device having in its upper portion suitably-arranged openings through which the steam is directed and its water separated from it, and in its lower portion a receptacle for the separated water, said receptacle being out of direct communication with the course of the steam in such manner that the water contained therein will not again be carried with the steam.

4. A separating throttle-valve comprising a casing having a valve controlling the supply of steam to the place of use, and having also a device for mechanically separating water from the steam, said device having in its upper portion suitably-arranged openings through which the steam is directed and its water separated from it and in its lower portion a receptacle for the separated water, and a series of openings separating the water-receptacle from the steam-channel above and through which the separated water falls into said receptacle.

5. A separating throttle-valve comprising a casing having a valve controlling the supply of steam to the place of use, and having also a device for mechanically separating water from the steam at the instant of its admission to its place of use, said device having a large number of small openings in its upper portion and arranged in a plurality of separate sets occupying different vertical planes whereby the steam is caused, in passing through said openings to bend upon itself a plurality of times in its flow to the exit, and having also a water-receptacle in its lower portion and a steam-exit channel contiguous thereto but separated therefrom, said receptacle being separated from that portion of the casing having the steam-separating openings but communicating therewith by a series of openings through which the water falls into said receptacle.

6. In a steam-separator, a number of small openings in the passage of the entering steam, arranged in a plurality of separate sets occupying different vertical planes and separated by a space or passage whereby the steam is caused, in passing through said openings, to bend upon itself a plurality of times in its flow to the exit.

7. In a steam-separator, a number of small openings in the passage of the entering steam, arranged in a plurality of separate sets occupying different vertical planes and separated by a space or passage whereby the steam is caused, in passing through said openings and space or passage, to bend upon itself a plurality of times in its flow to the exit, and a water-receptacle below and separated from the steam-passage in which said openings are formed, but having a communication therewith through openings through which the water falls into said receptacle.

8. In a steam-separator, a number of small openings in the passage of the entering steam, arranged in a plurality of separate sets occupying different vertical planes and separated by a space or passage whereby the steam is caused, in passing through said openings and space or passage, to bend upon itself a plurality of times in its flow to the exit, and a water-receptacle below and separated from the steam-passage in which said openings are formed, but having a communication therewith through openings through which the water falls into said receptacle, said receptacle being separated from but contiguous to the steam-exit channel.

9. In a steam-separator, a number of small openings in the passage of the entering steam, arranged in a plurality of separate sets occupying different vertical planes whereby the steam is caused, in passing through said openings, to bend upon itself a plurality of times in its flow to the exit, said openings being made in parts adapted to be removed when worn, for the substitution of others.

10. A separating throttle-valve comprising a casing having fitted in one portion thereof a valve controlling the supply of steam in its course from the boilers to its place of use and having formed within another portion of it, a means for mechanically separating the water from the steam, said means comprising passages provided with openings arranged in separate sets occupying different vertical planes, adapted to cause the steam to bend in its flow, and a water-receptacle to catch the separated water.

11. The combination of a valve controlling the supply of steam to the place of use and a separating device in close proximity to said valve, both valve and separating device being in close juxtaposition to the place of use of the steam, and said device having water-separating openings arranged in separate planes and separated by a space or passage, and adapted to cause the steam to bend in its course or flow, said openings having a total area greater than that of the main steam-pipe controlled by the valve.

12. In a steam-separator, water-separating openings arranged in separate sets occupying different vertical planes and separated by a space or passage, and adapted to cause the steam to bend in its course or flow, said openings having a total area greater than that of the main steam-pipe which supplies the separator.

In witness whereof I have hereunto set my hand.

JOHN C. H. STUT.

Witnesses:
S. H. NOURSE,
WM. F. BOOTH.